(12) United States Patent
Jhaveri et al.

(10) Patent No.: US 9,605,179 B1
(45) Date of Patent: Mar. 28, 2017

(54) THERMOSETTABLE COATING COMPOSITIONS USING PENDANT CARBAMATE-FUNCTIONAL POLYURETHANE POLYMERS AND METHODS OF FORMING THE THERMOSETTABLE COATING COMPOSITIONS

(71) Applicant: BASF Coatings GmbH, Muenster (DE)

(72) Inventors: Sarav B. Jhaveri, Lincoln Park, MI (US); Donald H. Campbell, Hartland, MI (US)

(73) Assignee: BASF Coatings GmbH, Muenster (DE)

( * ) Notice: Subject to any disclaimer, the term of this patent is extended or adjusted under 35 U.S.C. 154(b) by 0 days.

(21) Appl. No.: 14/965,031

(22) Filed: Dec. 10, 2015

(51) Int. Cl.
*B32B 27/40* (2006.01)
*C09D 175/12* (2006.01)
*C09D 175/08* (2006.01)

(52) U.S. Cl.
CPC .................................. *C09D 175/08* (2013.01)

(58) Field of Classification Search
None
See application file for complete search history.

(56) References Cited

FOREIGN PATENT DOCUMENTS

DE  4432897 A1 * 3/1996 ................ C08F 8/30

OTHER PUBLICATIONS

Structure Search (Oct. 7, 2016).*
Computer-generated English translation of DE 4432897 A1.*

* cited by examiner

*Primary Examiner* — Vu A Nguyen
(74) *Attorney, Agent, or Firm* — Quinn IP Law

(57) ABSTRACT

A thermosettable coating composition comprises a reaction product of a polyurethane polymer having at least one pendant carbamate functional group and a crosslinker reactive with the at least one pendant carbamate functional group. The polyurethane polymer is a polymerization reaction product of at least one diol having a primary carbamate functional group and at least one polyisocyanate. A method of forming a thermosettable coating composition includes polymerizing a mixture to form the polyurethane polymer, and combining the polyurethane polymer and a crosslinker reactive with the at least one pendant carbamate functional group to form the thermosettable coating composition. A coated article formed from the thermosettable coating composition is also disclosed.

16 Claims, No Drawings

THERMOSETTABLE COATING COMPOSITIONS USING PENDANT CARBAMATE-FUNCTIONAL POLYURETHANE POLYMERS AND METHODS OF FORMING THE THERMOSETTABLE COATING COMPOSITIONS

TECHNICAL FIELD

The disclosure relates to a thermosettable coating composition, a method of forming the thermosettable coating composition, and a coated article formed from the thermosettable coating composition.

BACKGROUND

Polyurethane coating compositions generally include polyurethane polymers having chemically-stable, polar urethane linkages that are capable of hydrogen bonding. As such, cured films formed from polyurethane coating compositions may have good mechanical stability and exterior weatherability. Further, the cured films may exhibit increased flexibility when synthesized from a medium molecular weight polymeric diol such as a polyester polyol or a polyether polyol that has a number average molecular weight of from about 500 g/mol to about 4,000 g/mol.

Polyurethane polymers generally include a backbone or chain having two ends, and may be combined with a crosslinker to form the polyurethane coating composition. More specifically, the polyurethane polymer may have a hydroxyl functional group present at both ends of the backbone and the hydroxyl functional group may be reactive with the crosslinker. However, since a linear polyurethane polymer may only include two hydroxyl functional groups, i.e., one at each end of the backbone or chain, crosslinking density may be low.

Carbamate functional groups may also be introduced at the ends of the polyurethane polymer backbone by reacting terminal isocyanate groups with a hydroxy carbamate compound. However, the resulting linear polyurethane polymer may again only include two carbamate functional groups, i.e., one at each end of the backbone or chain. As such, crosslinking density may again be rather low, particularly for higher molecular weight polyurethane polymers used to make aqueous polyurethane-based automotive coating compositions.

SUMMARY

A thermosettable coating composition includes a reaction product of a polyurethane polymer and a crosslinker. The polyurethane polymer has at least one pendant carbamate functional group and is a polymerization reaction product of at least one diol having a primary carbamate functional group and at least one polyisocyanate. The polymerization reaction product may optionally also include at least one isocyanate-reactive monomer and/or at least one isocyanate-reactive prepolymer. The crosslinker is reactive with the at least one pendant carbamate functional group and may be a melamine formaldehyde resin.

The polyurethane polymer may have a backbone having two ends, and the at least one pendant carbamate functional group may extend from the backbone and be spaced apart from each of the two ends.

The at least one diol may include from about 4 carbon atoms to about 8 carbon atoms. Further, the at least one diol may be a reaction product of glycerol carbonate and a compound selected from the group consisting of ammonia, primary amines, and combinations thereof. For example, the at least one diol may be selected from the group consisting of 2,3-dihydroxypropyl carbamate, 1,3-dihydroxy-2-carbamoylpropane, and combinations thereof. The at least one diol may be present in the polymerization reaction product in an amount of from about 0.1 part by weight to about 40 parts by weight based on 100 parts by weight of the polymerization reaction product.

In one embodiment, the polymerization reaction product includes the at least one isocyanate-reactive monomer, and the at least one isocyanate-reactive monomer is a polymeric diol. The polymeric diol may be present in the polymerization reaction product in an amount of from about 10 parts by weight to about 70 parts by weight based on 100 parts by weight of the polymerization reaction product. The polymeric diol may be a polyester diol comprising a reaction product of a carbamate-functional diol and a member selected from the group consisting of carboxylic acids, esterifiable derivatives of carboxylic acids, and combinations thereof. In another embodiment, the polymeric diol may be a polyether diol. In yet another embodiment, the polymeric diol may be a polycarbonate diol.

A method of forming a thermosettable coating composition includes polymerizing a mixture to form a polyurethane polymer having at least one pendant carbamate functional group. The mixture includes at least one diol having a primary carbamate functional group and at least one polyisocyanate. Optionally, the mixture further includes at least one isocyanate-reactive monomer and/or at least one isocyanate-reactive prepolymer. The method also includes combining the polyurethane polymer and a crosslinker reactive with the at least one pendant carbamate functional group to form the thermosettable coating composition.

The polyurethane polymer may have a terminal hydroxyl group, and the method may further include reacting the terminal hydroxyl group to form a terminal carbamate functional group. The method may also include dispersing the polyurethane polymer in an aqueous medium to form a polyurethane dispersion.

A coated article includes a substrate and a cured film disposed on the substrate. The cured film is formed from a thermosettable coating composition comprising a reaction product of a polyurethane polymer and a crosslinker. The polyurethane polymer has at least one pendant carbamate functional group and is a polymerization reaction product of at least one diol having a primary carbamate functional group and at least one polyisocyanate. Optionally, the polymerization reaction product includes at least one isocyanate-reactive monomer and/or at least one isocyanate-reactive prepolymer. The crosslinker is reactive with the at least one pendant carbamate functional group.

For convenience, "resin" is used in this disclosure to encompass resin, oligomer, and polymer. "Binder" refers to film-forming components (also called the "vehicle") of the thermosettable coating composition. Thus, resins, crosslinkers, and other film-formers are part of the binder, but solvents, pigments, additives like antioxidants, hindered amine light stabilizers (HALS), ultraviolet (UV) light absorbers, leveling agents, and the like that are not film formers are not part of the binder.

"A," "an," "the," "at least one," and "one or more" are used interchangeably to indicate that at least one of the item is present, and a plurality of such items may be present unless the context clearly indicates otherwise. All numerical values of parameters (e.g., of quantities or conditions) in this disclosure, including the appended claims, are to be understood as being modified in all instances by the term "about" whether or not "about" actually appears before the numerical value. "About" indicates that the stated numerical value allows some slight imprecision (i.e., with some approach to exactness in the value; approximately or reasonably close to the value; nearly). If the imprecision provided by "about" is not otherwise understood with this ordinary meaning, then "about" as used herein indicates at least variations that may arise from ordinary methods of measuring and using such parameters. In addition, disclosure of a range includes disclosure of all values and further divided ranges within the entire range. Each value within a range and the endpoints of a range are hereby all disclosed as separate embodiments. The terms "comprises," "comprising," "including," and "having" are inclusive and therefore specify the presence of stated items, but do not preclude the presence of other items. The term "or" includes each of the listed items individually and any and all combinations of two or more of the listed items. Thus, "a, b, or c" is a disclosure of a alone, b alone, c alone, both a and b, both a and c, both b and c, and all of a, b, and c.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

A detailed description of exemplary, nonlimiting embodiments follows.

Disclosed are thermosettable coating compositions, a method of forming the thermosettable coating compositions, and coated articles formed from the thermosettable coating compositions. The thermosettable coating compositions include a reaction product of a polyurethane polymer and a crosslinker. The polyurethane polymer is polymerized from, i.e., is a polymerization reaction product of, at least one carbamate-functional diol, i.e., at least one diol having a primary carbamate functional group, and at least one polyisocyanate, e.g., a diisocyanate. Optionally, the polymerization reaction product may include at least one isocyanate-reactive monomer and/or at least one isocyanate-reactive prepolymer. The at least one isocyanate-reactive monomer may be a polyester diol, a polyether diol, or a polycarbonate diol.

The polyurethane polymers have at least one pendant or lateral carbamate functional group. The polyurethane polymers may optionally also have one or more terminal carbamate functional groups. The crosslinker is reactive with the at least one pendant carbamate functional group of the polyurethane polymer. The crosslinker may be an aminoplast crosslinker. For example, the crosslinker may be a melamine formaldehyde resin since melamine-carbamate crosslinking is more stable to hydrolysis than hydroxymelamine crosslinking.

Thermoset coatings or cured films obtained by curing the thermosettable coating compositions may have a higher crosslink density as compared with thermoset coatings obtained by curing a coating composition containing a polyurethane polymer having only terminal carbamate functional groups. The higher crosslink density of cured films formed from the thermosettable coating compositions provide improved coating properties including cured films having higher flexural modulus, improved resistance to scratch and mar, better resistance to chemical marring and hydrolysis, better weatherability, and improved adhesion.

The at least one diol having the primary carbamate functional group may have from 4 carbon atoms to about 8 carbon atoms. As one example, the at least one diol may be a reaction product of glycerol carbonate and a compound selected from the group consisting of ammonia, primary amines, and combinations thereof. That is, the at least one diol may be synthesized by a ring opening reaction of glycerol carbonate with ammonia. The aminolysis reaction of glycerol carbonate with primary amines in organic and aqueous-organic media forms two hydroxyurethane isomers, α- and β-hydroxyurethane isomers (I) and (II), respectively:

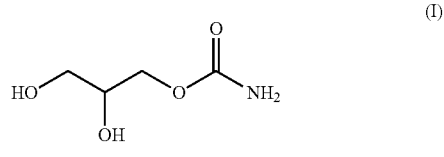

2,3-dihydroxypropyl carbamate

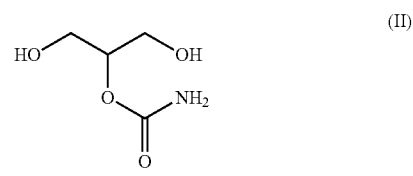

1,3-dihydroxy-2-carbamoylpropane and a partial decomposition of glycerol carbonate into glycerol. Therefore, the at least one diol may be selected from the group consisting of 2,3-dihydroxypropyl carbamate, 1,3-dihydroxy-2-carbamoylpropane, and combinations thereof. For the reaction of ammonia with glycerol carbonate in water, the α-hydroxyurethane isomer (I) (2,3-dihydroxypropyl carbamate) is the major product. The reaction can be monitored by Fourier transform infrared spectroscopy (FTIR) by following the disappearance of the carbonate peak (C=O stretch at 1,787 $cm^{-1}$). Reaction of the carbonate with a primary amine $H_2NR$— rather than ammonia produces a secondary carbamate functional group, —O—C(=O)—NHR.

The polymerization reaction product may comprise from about 0.1 weight percent to about 40 weight percent of the carbamate-functional diol. That is, the at least one diol may be present in the polymerization reaction product in an amount of from about 0.1 part by weight to about 40 parts by weight based on 100 parts by weight of the polymerization reaction product. For example, the polymerization reaction product may comprise from about 0.1 weight percent or from about 1 weight percent or from about 3 weight percent or from about 5 weight percent or from about 7 weight percent or from about 10 weight percent or from about 12 weight percent to about 40 weight percent or to about 35 weight percent or to about 30 weight percent or to about 25 weight percent or to about 20 weight percent of the at least one diol having the primary carbamate functional group. Examples of suitable ranges for the amount of the at least one carbamate-functional diol based on total weight of the polymerization reaction product include from about 1 weight percent to about 40 weight percent, or from about 3 weight percent to about 35 weight percent, or from about 5 weight percent to about 40 weight percent, or from about 5 weight percent to about 35 weight percent, or from about 5 weight percent to about 30 weight percent, or from about 7 weight percent to about 30 weight percent, or from about 7 weight percent to about 25 weight percent, or from about 10 weight percent to about 30 weight percent, or from about 10 weight percent to about 25 weight percent.

The polyurethane polymer may have a backbone having two ends, and the at least one pendant carbamate functional group may extend from the backbone and be spaced apart from the two ends. That is, the at least one diol having the primary carbamate functional group, i.e., the carbamate-functional comonomer, may provide the polyurethane polymer with the at least one carbamate functional group spaced along the backbone. Terminal hydroxyl or isocyanate groups of the polyurethane polymer at the ends of the backbone may optionally be reacted to form terminal carbamate functional groups.

In particular, an isocyanate group may be converted to a carbamate functional group by reaction with a monohydroxycarbamate, e.g., hydroxypropylcarbamate, to form the primary carbamate functional group. That is, the resulting polyurethane polymer may include one or more primary carbamate functional groups represented by the structure

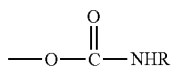

in which R is H. Primary carbamate functional groups may be particularly beneficial for reaction with aminoplast crosslinkers. Substitution of one of the hydrogens on the nitrogen with an alkyl group, such as, without limitation, a methyl group, may greatly reduce the reactivity of the remaining hydrogen of the carbamate functional group with aminoplast crosslinkers. The conversion reaction may preferably occur in the presence of a catalyst such as an organometallic catalyst, e.g., dibutyltin dilaurate, and may be performed at elevated temperatures. The terminal isocyanate groups may be reacted with ammonia to form urea groups.

The polyurethane polymer may also include one or more secondary carbamate functional groups represented by the structure

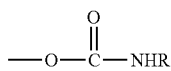

in which R is alkyl.

The at least one diol having the primary carbamate functional group may be polymerized with at least one polyisocyanate, such as a diisocyanate, to form the polyurethane polymer. Suitable diisocyanates may include aliphatic, cycloaliphatic, or aromatic diisocyanates. Specific diisocyanate compounds used to prepare the polyurethane polymer may include, without limitation, isophorone diisocyanate (IPDI), 4,4'-methylenedicyclohexyl diisocyanate ($H_{12}MDI$), cyclohexyl diisocyanate (CHDI), m-tetramethyl xylene diisocyanate (m-TMXDI), p-tetramethyl xylene diisocyanate (p-TMXDI), 4,4'-methylene diphenyl diisocyanate (MDI, also referred to as 4,4'-diphenylmethane diisocyanate), 2,4- or 2,6-toluene diisocyanate (TDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, meta-xylylenediisocyanate and para-xylylenediisocyanate (XDI), 1,5-tetrahydro-naphthalene diisocyanate, 4,4'-dibenzyl diisocyanate, and combinations of these.

Nonlimiting examples of higher-functionality polyisocyanates that may be used in limited amounts to produce branched thermoplastic polyurethane polymers (optionally along with monofunctional alcohols or monofunctional isocyanates) may include 1,2,4-benzene triisocyanate, 1,3,6-hexamethylene triisocyanate, 1,6,11-undecane triisocyanate, bicycloheptane triisocyanate, triphenylmethane-4,4',4"-triisocyanate, isocyanurates of diisocyanates, biurets of diisocyanates, and allophanates of diisocyanates.

Besides the at least one diol having the primary carbamate functional group and the at least one polyisocyanate, the polymerization reaction product may further include at least one isocyanate-reactive monomer. Relatively inflexible polyurethane polymers are prepared by polymerization with no additional isocyanate-reactive monomers or with one or more compounds having two isocyanate-reactive groups having a low molecular weight, e.g., generally 400 g/mol or less, and generally nonpolymeric chain extension compounds or extenders. Thermoplastic polyurethane elastomers may be prepared by polymerizing a polymeric diol with the at least one diol having the primary carbamate functional group, the at least one polyisocyanate, and optionally one or more chain extension compounds or extenders.

In another embodiment, the polymerization reaction product may alternatively or additionally include the at least one isocyanate-reactive prepolymer. As used herein, the terminology prepolymer refers to one or more monomers that have been reacted to an intermediate state to form an intermediate material which may be further polymerized to a final material having a comparatively higher molecular weight. The terminology prepolymer may also refer to a mixture of an isocyanate-reactive polymer and an unreacted monomer. For example, the isocyanate-reactive prepolymer may be formed by combining an excess of an original diisocyanate having two isocyanate functional groups with a diol having two hydroxyl groups such that one of the isocyanate functional groups reacts with one of the hydroxyl groups, and another one of the hydroxyl groups reacts with another diisocyanate. As such, the resulting isocyanate-reactive prepolymer may have a comparatively higher molecular weight than the original diisocyanate.

In one embodiment, the at least one isocyanate-reactive monomer is a polymeric diol. Examples of suitable polymeric diols may include polyether diols, polycarbonate diols, polybutadiene diols, and polyolefin diols. Chain extension compounds or extenders may include compounds having two or more functional groups reactive with isocyanate groups, such as the diols, amino alcohols, and diamines. The polyurethane polymer may be substantially linear, i.e., substantially all of the reactants may be difunctional.

Nonlimiting examples of suitable diols that may be used as chain extension compounds or extenders include ethylene glycol and lower oligomers of ethylene glycol including diethylene glycol, triethylene glycol, and tetraethylene glycol; propylene glycol and lower oligomers of propylene glycol including dipropylene glycol, tripropylene glycol, and tetrapropylene glycol; cyclohexanedimethanol; 1,6-hexanediol; 2-ethyl-1,6-hexanediol; 1,4-butanediol; 2,3-butanediol; 1,5-pentanediol; 1,3-propanediol; butylene glycol; neopentyl glycol; dihydroxyalkylated aromatic compounds such as the bis (2-hydroxyethyl) ethers of hydroquinone and resorcinol; p-xylene-α,α'-diol; the bis (2-hydroxyethyl)

ether of p-xylene-α,α'-diol; m-xylene-α,α'-diol; and combinations of these. Other active hydrogen-containing chain extenders that contain at least two active hydrogen groups may be used, for example, dithiols, diamines, or compounds having a mixture of hydroxyl, thiol, and amine groups, such as alkanolamines, aminoalkyl mercaptans, and hydroxyalkyl mercaptans, among others. Suitable diamine extenders include, without limitation, ethylene diamine, diethylene triamine, triethylene tetraamine, and combinations of these. Other typical chain extenders may include amino alcohols such as ethanolamine, propanolamine, butanolamine, and combinations of these. The molecular weights of the chain extenders preferably range from about 60 g/mol to about 400 g/mol.

In addition to difunctional extenders, a small amount of a trifunctional extender such as trimethylolpropane, 1,2,6-hexanetriol, and glycerol, or monofunctional active hydrogen compounds such as butanol or dimethylamine, may also be included. The amount of trifunctional extender or monofunctional compound employed may be, for example, 5 weight percent or less or 2 weight percent or less based on the total weight of the monomers used in the polyurethane polymer polymerization.

In one embodiment, the polymeric diol is a polyester diol including a reaction product of a carbamate-functional diol and a member selected from the group consisting of carboxylic acids, esterifiable derivatives of carboxylic acids, and combinations thereof. That is, suitable polyester diols used in forming the polyurethane polymer may in general be prepared by reacting: (a) polycarboxylic acids or their esterifiable derivatives, together if desired with monocarboxylic acids, (b) polyols, together if desired with monools, and (c) if desired, other modifying components.

Nonlimiting examples of polycarboxylic acids and their esterifiable derivatives include phthalic acid, isophthalic acid, terephthalic acid, halophthalic acids such as tetrachloro- or tetrabromophthalic acid, adipic acid, glutaric acid, azelaic acid, sebacic acid, fumaric acid, maleic acid, trimellitic acid, pyromellitic acid, tetrahydrophthalic acid, hexahydrophthalic acid, 1,2-cyclohexanedicarboxlic acid, 1,3-cyclohexane-discarboxlic acid, 1,4-cyclohexane-dicarboxylic acid, 4-methylhexahydrophthalic acid, endomethylenetetrahydropthalic acid, tricyclodecane-dicarboxylic acid, endoethylenehexahydropthalic acid, camphoric acid, cyclohexanetetracarboxylic acid, and cyclobutanetetracarboxylic acid. The cycloaliphatic polycarboxylic acids may be employed either in their cis or in their trans form or as a mixture of the two forms.

Esterifiable derivatives of these polycarboxylic acids include their single or multiple esters with aliphatic alcohols having from 1 carbon atom to 4 carbon atoms or hydroxy alcohols having up to 4 carbon atoms, preferably the methyl and ethyl ester, as well as the anhydrides of these polycarboxylic acids.

Nonlimiting examples of suitable monocarboxylic acids that can be used together with the polycarboxylic acids include benzoic acid, tert-butylbenzoic acid, lauric acid, isononanoic acid, and fatty acids of naturally occurring oils.

Nonlimiting examples of suitable polyols may include ethylene glycol, butylene glycol, neopentyl glycol, propanediol s, butanediols, hexanediols, diethylene glycol, cyclohexanediol, cyclohexanedimethanol, trimethylpentanediol, ethylbutylpropanediol ditrimethylolpropane, trimethylolethane, trimethylolpropane, glycerol, pentaerythritol, dipentaerythritol, tris-hydroxyethyl isocyanate, polyethylene glycol, and polypropylene glycol.

Nonlimiting examples of monoalcohols that may be used together with the polyols include butanol, octanol, lauryl alcohol, and ethoxylated and propoxylated phenols.

Nonlimiting examples of suitable modifying components include compounds which contain a group which is reactive with respect to the functional groups of the polyester diol, including polyisocyanates and/or diepoxide compounds, and also if desired, monoisocyanates and/or monoepoxide compounds.

The polyester polymerization may be carried out at a temperature of from about 180° C. to about 280° C. in the presence of an appropriate esterification catalyst. Typical esterification catalysts may include protonic acids, Lewis acids, titanium alkoxides, and dialkyltin oxides, for example, lithium octanoate, dibutyltin oxide, dibutyltin dilaurate, and para-toluenesulfonic acid under reflux with small quantities of a suitable solvent as an entraining agent, such as an aromatic hydrocarbon, for example, xylene, or a (cyclo)aliphatic hydrocarbon, for example, cyclohexane.

In another embodiment, the polymeric diol is a polyether diol. The polyether diol or polycaprolactone diol reactant for preparing the polyurethane polymer may be obtained by reacting a diol initiator, e.g., 1,3-propanediol or ethylene or propylene glycol, with a lactone or alkylene oxide chain-extension reagent. The lactone may be ring opened by an active hydrogen. Examples of suitable lactones include, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these. In one preferred embodiment, the lactone is ε-caprolactone. Useful catalysts include those mentioned above for polyester synthesis. Alternatively, the reaction can be initiated by forming a sodium salt of the hydroxyl group on molecules that will react with the lactone ring.

In other embodiments, a diol initiator may be reacted with an oxirane-containing compound or cyclic ether to produce the polyether diol. Alkylene oxide polymer segments include, without limitation, the polymerization products of ethylene oxide, propylene oxide, 1,2-cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The oxirane- or cyclic ether-containing compound may be selected from the group consisting of ethylene oxide, propylene oxide, butylene oxide, tetrahydrofuran, and combinations of these.

The alkylene oxide polymerization may be base-catalyzed. The polymerization may be carried out, for example, by charging the hydroxyl-functional initiator compound and a catalytic amount of caustic, such as potassium hydroxide, sodium methoxide, or potassium tert-butoxide, and adding the alkylene oxide at a sufficient rate to keep the monomer available for reaction.

Two or more different alkylene oxide monomers may be randomly copolymerized by coincidental addition or may be polymerized in blocks by sequential addition. Homopolymers or copolymers of ethylene oxide or propylene oxide may be used, particularly polyethylene oxide, to make a polyurethane polymer that can form a nonionic, aqueous dispersion. Tetrahydrofuran may be polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation may be by formation of a tertiary oxonium ion. The polytetrahydrofuran segment can be prepared as a "living polymer" and terminated by reaction with the hydroxyl group of a diol such as any of those mentioned above. Polytetrahydrofuran is also referred to as polytetramethylene ether glycol (PTMEG).

In yet another embodiment, the polymeric diol is a polycarbonate diol. Aliphatic polycarbonate diols that may be useful for polymerizing the polyurethane polymer for the disclosed thermosettable coating compositions may be prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates may be prepared from reaction of bisphenols, e.g., bisphenol A, with phosgene or diphenyl carbonate.

In another embodiment, the polymeric diol is a polyolefin diol. Polyolefin diols that may be useful for polymerizing the polyurethane polymer for the disclosed thermosettable coating compositions may be prepared by the hydroxylation of an olefinic epoxide. Suitable olefinic epoxides may be formed by treating an alpha olefin with a peroxide, and may be commercially available under the trade name AlphaPlus® from Chevron Phillips Chemical Company LP of The Woodlands, Tex.

In various embodiments, the polymeric diol may have a weight average molecular weight of at least about 500 g/mol, or at least about 1,000 g/mol, or at least about 1,800 g/mol, and a weight average molecular weight of up to about 10,000 g/mol, or up to about 5,000 g/mol, or up to about 4,000 g/mol. The polymeric diol can have a weight average molecular weight of from about 500 g/mol to about 10,000 g/mol, or from about 1,000 g/mol to about 5,000 g/mol, or from about 1,500 g/mol to about 4,000 g/mol. Weight average molecular weight may be determined by the ASTM D-4274 test method.

The polymeric diol may be present in the polymerization reaction product in an amount of from about 10 parts by weight to about 70 parts by weight based on 100 parts by weight of the polymerization reaction product. That is, the polyurethane polymer may include segments formed from the at least one polymeric diol in an amount of from about 10 parts by weight to about 70 parts by weight based on 100 parts by weight of the polyurethane polymer. For example, the polymeric diol segments may be from about 10 weight percent or from about 20 weight percent or from about 25 weight percent or from about 30 weight percent or from about 35 weight percent to about 70 weight percent or to about 65 weight percent or to about 60 weight percent or to about 55 weight percent or to about 50 weight percent of the polyurethane polymer. The polymeric diol segments may typically be present in the polymerization reaction product in an amount of from about 35 parts by weight to about 65 parts by weight, and preferably in an amount of from about 35 parts by weight to about 50 parts by weight based on 100 parts by weight of the polyurethane polymer.

In an example of the disclosed technology, the pendant carbamate-functional polyurethane polymer having at least one pendant carbamate functional group may be prepared using from about 0.1 part by weight to about 20 parts by weight of the at least one diol having a primary carbamate functional group, and from about 10 parts by weight to about 70 parts by weight of the polymeric diol selected from the group consisting of polyether diols, polyester diols, polycarbonate diols, polyolefin diols, polyacrylate diols, and polybutadiene diols based on 100 parts by weight of the polymerization reaction product.

A method of forming the thermosettable coating composition includes polymerizing a mixture to form the polyurethane polymer having at least one pendant carbamate functional group. The mixture includes the at least one diol having the primary carbamate functional group, the at least one polyisocyanate, and optionally, the at least one isocyanate-reactive monomer and/or the isocyanate-reactive prepolymer. The method also includes combining the polyurethane polymer and the crosslinker reactive with the at least one pendant carbamate functional group to form the thermosettable coating composition.

In one embodiment, the polyurethane polymer may have a terminal hydroxyl group, and the method may further include reacting the terminal hydroxyl group to form a terminal primary carbamate functional group. That is, in contrast to a pendant hydroxyl group which may be attached to or extend from the backbone of the polyurethane polymer, the terminal hydroxyl group may be attached to or extend from the end of the polyurethane polymer.

The method may also include dispersing the polyurethane polymer in an aqueous medium to form a polyurethane dispersion. For example, the pendant carbamate-functional polyurethane polymer may be polymerized from a carboxylic acid-functional or carboxylic anhydride-functional monomer to form the polyurethane polymer that can be at least partially salted or neutralized with a base, and then dispersed into an aqueous medium to form a polyurethane dispersion. Alternatively, the polyurethane dispersion may be formed by dispersing a polyurethane polymer containing polyethylene oxide functional groups and the diol having the primary carbamate functional group in an aqueous medium. Alternatively, the aqueous dispersion may be formed by dispersing a polyurethane polymer containing at least partially ionized acid functional groups and the diol having the primary carbamate functional group in an aqueous medium. An isocyanate-functional polyurethane polymer containing the carbamate-functional comonomer, i.e., the diol having the primary carbamate functional group, may be dispersed in water in the presence of a polyamine to form a polyurethane dispersion of a polyamine-extended polyurethane polymer.

The polyurethane polymer can be polymerized with a comonomer that provides water dispersibility. In one example, the polyurethane polymer can be dispersed in water to form a nonionic aqueous polyurethane dispersion when the polyurethane polymer is polymerized with nonionic dispersing groups such as polyethylene oxide groups, as already mentioned. In another example, the polyurethane polymer can be dispersed in water to form an anionic aqueous polyurethane dispersion when the polyurethane polymer is polymerized with monomers having carboxyl groups that can be at least partially neutralized to disperse the resin, for example dihydroxycarboxylic acids.

Nonlimiting examples of suitable dihydroxycarboxylic acids include α,α-dimethylolalkanoic acids, such as 2,2-dimethylolacetic acid, 2,2-dimethylolpropionic acid, 2,2-dimethylolbutyric acid, and 2,2-dimethylolpentanoic acid, glyceric acid, erthronic acid, threonic acid, ribonic acid, gluconic acid, and mannonic acid. Both organic and inorganic bases can be used to neutralize the groups capable of forming anions. Primary, secondary, and tertiary amines, such as ethylamine, propylamine, dimethylamine, dibutylamine, cyclohexylamine, benzylamine, morpholine, piperidine, and triethanolamine, may be used. Tertiary amines, especially dimethylethanolamine, triethylamine, tripropylamine, and tributylamine, may be used as the neutralizing agents. By "at least partially neutralized" it is meant that at least one, but less than all, of the saltable groups on the resin are neutralized, and up to all of the saltable groups may be neutralized. The degree of neutralization that is required to afford the requisite water-dispersibility for a particular resin will depend upon its chemical composition and molecular weight.

In one example, an isocyanate-functional polyurethane polymer and the at least one diol having the primary carbamate function group, i.e., the carbamate-functional comonomer, may be dispersed in water in the presence of a polyamine to form a dispersion of a polyamine-extended polyurethane polymer. Isocyanate-functional polyurethane polymers may be prepared by carrying out the reaction with from 1.2 equivalents NCO to 2.5 equivalents NCO: 1 equivalent OH.

Examples of suitable polyamines include ethylene diamine, diethylene triamine, triethylenetetraamine, propylene diamine, butylene diamine, cyclohexylenediamine, piperazine, 2-methyl-piperazine, phenylenediamine, toluene diamine, tris(2-aminoethyl)amine, 3,3'-dichloro-4,4'-diphenyldiamine, 4,4'-diphenyldiamine, 2,6-diaminopyridine, 4,4'-diamine diphenylmethane, isophorone diamine, diethyltoluene diamine, aminoethylethanolamine, and combinations of these. The dispersion may be heated to, for example, from about 30° C. to about 50° C.

The reaction of the at least one diol having the primary carbamate functional group; the at least one polyisocyanate; optionally, the at least one isocyanate-reactive monomer; optionally, the isocyanate-reactive prepolymer; and optionally, any chain extension agent may be carried out at an elevated temperature in the presence of a catalyst. Typical catalysts for this reaction include organotin catalysts such as stannous octoate, dibutyl tin dilaurate, dibutyl tin diacetate, dibutyl tin oxide, tertiary amines, zinc salts, and manganese salts.

In various embodiments, the polyurethane polymer having the at least one pendant carbamate functional group and the crosslinker or curing agent may be present in the thermosettable coating composition in a weight ratio of parts by weight of the polyurethane polymer:parts by weight of the crosslinker of from about 50:50 to about 85:15, or from about 60:40 to about 75:25. Further, the thermosettable coating composition may include other film-forming materials such as other thermosetting resins or polymers as well as other curing agents or crosslinkers.

The resulting thermosettable coating composition may be an aqueous thermosettable coating composition such as an automotive basecoat coating composition. Automotive basecoat coating compositions including polyurethane polymers having a weight average molecular weight of from about 30,000 g/mol to about 100,000 g/mol may have excellent rheology and thus excellent application properties. Further, such automotive basecoat coating compositions may have excellent appearance of the applied coatings and, when flake pigments such as metal and mica are included, provide excellent gonioapparent effect in cured films. Without intending to be limited by theory, the at least one pendant carbamate functional group of the polyurethane polymer may provide excellent crosslink density and physical properties of the cured films formed from the thermosettable coating composition.

In another example, the disclosed thermosettable coating compositions may be a solventborne coating composition in which the polyurethane polymers having lateral, pendant carbamate functional groups are dissolved in organic liquids, e.g., organic solvents. The disclosed thermosettable coating compositions may be particularly formulated as coating compositions for clearcoat, basecoat, or monocoat topcoat layers of automotive original equipment manufacturer (OEM) finishes.

The resulting polyurethane polymer may have a weight average molecular weight of from about 2,000 g/mol to about 100,000 g/mol. For example, the polyurethane polymer may have a weight average molecular weight of from about 30,000 g/mol to about 100,000 g/mol, or of from about 40,000 g/mol to about 80,000 g/mol.

When the polyurethane polymer is formed for an aqueous polyurethane dispersion, the polyurethane polymer may have a weight average molecular weight of from about 5,000 g/mol or from about 10,000 g/mol or from about 20,000 g/mol or from about 30,000 g/mol or from about 40,000 g/mol or from about 45,000 g/mol up to about 100,000 g/mol or up to about 90,000 g/mol or up to about 80,000 g/mol. For example, when the polyurethane polymer is formed for an aqueous polyurethane dispersion, the polyurethane polymer may have a weight average molecular weight of from about 30,000 g/mol to about 100,000 g/mol, or a weight average molecular weight of from about 35,000 g/mol to about 90,000 g/mol, or a weight average molecular weight of from about 40,000 g/mol to about 80,000 g/mol, or a weight average molecular weight of from about 45,000 g/mol to about 75,000 g/mol.

When the polyurethane polymer is formed for an aqueous polyurethane dispersion, the polyurethane polymer may have a number average molecular weight of from about 2,000 g/mol or from about 5,000 g/mol or from about 10,000 g/mol or from about 15,000 g/mol or from about 20,000 g/mol up to about 50,000 g/mol or up to about 45,000 g/mol or up to about 40,000 g/mol or up to about 35,000 g/mol or up to about 30,000 g/mol. For example, when the polyurethane polymer is formed for an aqueous polyurethane dispersion, the polyurethane polymer may have a number average molecular weight of from about 5,000 g/mol to about 40,000 g/mol, or a number average molecular weight of from about 8,000 g/mol to about 35,000 g/mol, or a number average molecular weight of from about 10,000 g/mol to about 35,000 g/mol.

When the polyurethane polymer is formed for a solventborne coating composition, the polyurethane polymer may have a weight average molecular weight of from about 2,000 g/mol or from about 5,000 g/mol or from about 8,000 g/mol or from about 10,000 g/mol or from about 12,000 g/mol or from about 15,000 g/mol up to about 50,000 g/mol or up to about 40,000 g/mol or up to about 35,000 g/mol or up to about 30,000 g/mol or up to about 25,000 g/mol or up to about 20,000 g/mol. For example, when the polyurethane polymer is formed for a solventborne coating composition, the polyurethane polymer may have a weight average molecular weight of from about 2,000 g/mol to about 40,000 g/mol, or a weight average molecular weight of from about 5,000 g/mol to about 40,000 g/mol, or a weight average molecular weight of from about 8,000 g/mol to about 35,000 g/mol, or a weight average molecular weight of from about 10,000 g/mol to about 30,000 g/mol.

When the polyurethane polymer is formed for a solventborne coating composition, the polyurethane polymer may have a number average molecular weight of from about 1,000 g/mol or from about 2,000 g/mol or from about 5,000 g/mol or from about 8,000 g/mol or from about 10,000 g/mol up to about 20,000 g/mol or up to about 22,000 g/mol or up to about 25,000 g/mol or up to about 28,000 g/mol or up to about 30,000 g/mol. For example, when the polyurethane polymer is formed for a solventborne coating composition, the polyurethane polymer may have a number average molecular weight of from about 1,000 g/mol to about 30,000 g/mol, or a number average molecular weight of from about 5,000 g/mol to about 28,000 g/mol, or a number average molecular weight of from about 8,000 g/mol to about 25,000 g/mol.

As set forth above, the polyurethane polymer having at least one pendant carbamate functional group may be formulated into a curable, thermosettable coating composition. The polyurethane polymer may be present in the thermosettable coating composition in an amount of from about 15 parts by weight to about 85 parts by weight based on a total weight of film-forming materials, i.e., based on the binder weight, in the thermosettable coating composition. The film-forming materials in the thermosettable coating composition other than the pendant carbamate-functional polyurethane polymer may include other thermosetting resins or polymers, as well as curing agents or crosslinkers for the pendant carbamate-functional polyurethane polymer and for any other thermosetting resins or polymers.

The thermosettable coating composition may be cured by a reaction of the polyurethane polymer having at least one pendant carbamate functional group, i.e., the pendant carbamate-functional polyurethane polymer, and a curing agent or crosslinker having one or more functional groups reactive with the at least one pendant carbamate functional group. The one or more functional groups may include active methylol, methylalkoxy, or butylalkoxy groups of aminoplast resins. The pendant carbamate-functional polyurethane polymers, when crosslinked with alkylated melamines, may impart urethane-functional crosslink linkages to a cured film to improve coating properties such as mechanical strength, scratch and marring properties, water and chemical resistance, outdoor weatherability, humidity and ultraviolet (UV) radiation exposure.

An aminoplast resin may be obtained by reacting an activated nitrogen with a lower molecular weight aldehyde and optionally with an alcohol such as a mono-alcohol having from one carbon atom to four carbon atoms, e.g., methanol, isopropanol, n-butanol, and isobutanol, to form an ether group. Examples of activated nitrogens include activated amines such as melamine, benzoguanamine, cyclohexylcarboguanamine, and acetoguanamine; ureas, including urea itself, thiourea, ethyleneurea, dihydroxyethyleneurea, and guanylurea; glycoluril; amides, such as dicyandiamide; and carbamate-functional compounds having at least one primary carbamate functional group or at least two secondary carbamate functional groups.

The lower molecular weight aldehyde may be selected from, for example, formaldehyde, acetaldehyde, crotonaldehyde, benzaldehyde, or other aldehydes useful for making aminoplast resins. Formaldehyde and acetaldehyde, especially formaldehyde, may be especially suitable. The activated nitrogen may be at least partially alkylolated with the aldehyde. Preferably, the activated nitrogen groups are fully alkylolated. The reaction may be catalyzed by an acid.

The optional alkylol groups formed by the reaction of the activated nitrogen with the aldehyde may be partially or fully etherified with one or more monofunctional alcohols. Suitable examples of monofunctional alcohols include, without limitation, methanol, ethanol, n-propanol, isopropanol, n-butanol, isobutanol, tert-butyl alcohol, and benzyl alcohol. Monofunctional alcohols having from one carbon atom to four carbon atoms and mixtures of these may be preferred. The aminoplast resin may be at least partially etherified, and in various embodiments, the aminoplast is fully etherified. For example, the aminoplast resins may have a plurality of methylol and/or etherified methylol, butylol, or alkylol groups, which may be present in any combination along with unsubstituted nitrogen hydrogens.

Examples of suitable crosslinkers or curing agents include, without limitation, melamine formaldehyde resins, including monomeric or polymeric melamine resins and partially or fully alkylated melamine resins; urea resins, e.g., methylol ureas such as urea formaldehyde resin; and alkoxy ureas such as butylated urea formaldehyde resin. One non-limiting example of a fully etherified melamine-formaldehyde resin is hexamethoxymethyl melamine.

Alkylol groups may be capable of self-reaction to form oligomeric and polymeric materials. Useful materials may be characterized by a degree of polymerization. For melamine formaldehyde resins, it may be preferable to use resins having a number average molecular weight of less than about 2,000 g/mol, more preferably less than about 1,500 g/mol, and even more preferably less than about 1,000 g/mol.

The thermosettable coating composition may further include a strong acid catalyst to enhance a cure reaction. Strong acid catalysts may include, for example, para-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts may be blocked with, for example, an amine.

The thermosettable coating composition may include a solvent. In general, for solventborne thermosettable coating compositions, the solvent may be any organic solvent or combination of organic solvents. In one embodiment, the solvent may be or may include a polar organic solvent. For example, the solvent may be or may include a polar aliphatic solvent, a polar aromatic solvent, ketone, ester, acetate, aprotic amide, aprotic sulfoxide, aprotic amine, or a combination of these. Examples of specific useful solvents include methyl ethyl ketone, methyl isobutyl ketone, n-amyl acetate, ethylene glycol butyl ether acetate, propylene glycol monomethyl ether acetate, xylene, N-methylpyrrolidone, blends of aromatic hydrocarbons, and combinations of these.

In another embodiment, the pendant carbamate-functional polyurethane polymer and aminoplast crosslinker may be dispersed in water or a mixture of water and a minor portion of organic water-soluble or water-miscible co-solvents.

The organic solvent may be present in the thermosettable coating composition in an amount of from about 0.01 part by weight to about 99 parts by weight, or from about 5 parts by weight to about 60 parts by weight, or from about 10 parts by weight to about 50 parts by weight based on 100 parts by weight of the thermosettable coating composition.

When the thermosettable coating composition is formulated as a monocoat topcoat coating composition, a basecoat coating composition, or a primer coating composition, the thermosettable coating composition may contain pigments and fillers, such as special effect pigments. Nonlimiting examples of special effect pigments that may be useful for basecoat coating compositions and monocoat topcoat coating compositions include metallic, pearlescent, and color-variable effect flake pigments. Metallic, pearlescent, and color-variable topcoat colors may be produced using one or more special flake pigments. Metallic colors are generally defined as colors having gonioapparent effects. For example, the American Society of Testing Methods (ASTM) document F-284 defines metallic as "pertaining to the appearance of a gonioapparent material containing metal flake."

Metallic basecoat colors may include metallic flake pigments such as aluminum flake pigments, coated aluminum flake pigments, copper flake pigments, zinc flake pigments, stainless steel flake pigments, and/or bronze flake pigments. Metallic basecoat colors may also include pearlescent flake pigments such as treated micas, e.g., titanium dioxide-coated micas and iron oxide-coated micas, to provide cured films formed from the thermosettable coating compositions with different appearances (e.g., a differing degree of reflectance or color) when viewed at various angles. Metal flakes may be cornflake type, lenticular, or circulation-resistant; micas may be natural, synthetic, or aluminum-oxide type. The flake pigments are typically satisfactorily dispersed in a binder component by stirring under low shear. The flake pigment or pigments may be included in the thermosettable coating composition in an amount of from about 0.01 part by weight to about 0.3 parts by weight or from about 0.1 part by weight to about 0.2 parts by weight based on 100 parts of total binder weight. Nonlimiting examples of flake pigments include PALIOCROM® pigments which are commercially available from BASF Corporation of Florham Park, N.J.

Nonlimiting examples of other suitable pigments and fillers that may be utilized in primer, basecoat, and monocoat topcoat thermosettable coating compositions formed from the pendant carbamate-functional polyurethane polymer include inorganic pigments such as titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barytes, ferric ammonium ferrocyanide (Prussian blue), and ultramarine, and organic pigments such as metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, nanoparticles based on silicon dioxide, aluminum oxide, and zirconium oxide. The pigment(s) and any filler(s) may be dispersed in a resin or a polymer or may be dispersed with a pigment dispersant, such as a binder resin.

In general, the pigment and dispersing resin, polymer, or dispersant may be brought into contact under a shear high enough to break down pigment agglomerates to primary pigment particles and to wet a surface of the pigment particles with the dispersing resin, polymer, or dispersant. The breaking of the agglomerates and the wetting of the primary pigment particles may be important for pigment stability and color development. Pigments and fillers may be utilized in amounts of up to about 60 parts by weight based on 100 parts by weight of the total weight of the thermosettable coating composition. The amount of pigment used may depend on the nature of the pigment, the depth of the color and the intensity of the effect the pigment is intended to produce, and on the dispersibility of the pigments in the pigmented thermosettable coating composition. The pigment may be present in the pigmented thermosettable coating composition in an amount of from about 0.5 parts by weight to about 50 parts by weight, or from about 1 part by weight to about 30 parts by weight, or from about 2 parts by weight to about 20 parts by weight, or from about 2.5 parts by weight to about 10 parts by weight.

Clearcoat thermosettable coating compositions may include no pigment, but may include small amount of colorants or fillers that do not unduly affect a transparency or a desired clarity of a clearcoat coating layer formed from the clearcoat thermosettable coating composition.

The thermosettable coating composition may include additional coating additives or agents such as, for example, surfactants; stabilizers; dispersing agents; ultraviolet light (UV) absorbers; hindered amine light stabilizer (HALS) compounds; benzotriazoles or oxalanilides; free-radical scavengers; slip additives; defoamers; reactive diluents; wetting agents such as siloxanes; fluorine compounds; carboxylic monoesters; phosphoric esters; polyacrylates, for example polybutyl acrylate; polyurethanes; adhesion promoters such as tricyclodecanedimethanol; flow control agents; film-forming assistants such as cellulose derivatives; rheology control additives; crosslinked polymeric microparticles; inorganic phyllosilicates, such as aluminum-magnesium silicates, sodium-magnesium and sodium-magnesium-fluorine-lithium phyllosilicates of the montmorillonite type; silicas such as Aerosil® commercially available from Evonik Industries of Piscataway, N.J.; or synthetic polymers containing ionic and/or associative groups such as polyvinyl alcohol, poly(meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes or polyacrylates; and flame retardants. The thermosettable coating compositions may include one or a combination of such additives.

The disclosed thermosettable coating compositions may be useful for the technologically- and esthetically-demanding field of automotive original equipment manufacturer (OEM) finishing and automotive refinishing. With particular preference, the thermosettable coating compositions may be useful for multistage coating processes, particularly for processes in which a pigmented basecoat film is first applied to an uncoated or precoated substrate before a layer of the thermosettable coating composition formed from the amphiphilic pendant carbamate-functional polyurethane polymer is applied to the pigmented basecoat film to provide a multicoat effect or color coating system having at least one pigmented basecoat and at least one clearcoat disposed on the at least one pigmented basecoat.

That is, a coated article includes a substrate and a cured film disposed on the substrate and formed from the thermosettable coating composition. The thermosettable coating composition may be applied to the substrate by any of a number of techniques. These techniques may include, for example, spray coating, dip coating, roll coating, curtain coating, knife coating, spreading, pouring, dipping, impregnating, and trickling. For automotive body panel substrates, spray coating such as, but not limited to, compressed-air spraying, airless spraying, high-speed rotation, electrostatic spray application, and/or hot-air spraying may be preferred. During such applying, the substrate to be coated may be stationary, and the application equipment or unit may be translatable with respect to the substrate. Alternatively the substrate to be coated, in particular a coil, may be moveable, and the application unit may be stationary relative to the substrate.

The applied thermosettable coating composition may first be dried so that at least some of any organic solvent or water may be stripped from the coating layer or film in an evaporation phase. Drying may be preferably accomplished at a temperature of from about room temperature to about 80° C. In the case of a basecoat thermosettable coating composition, drying may be followed by the application of a clearcoat coating composition. The applied clearcoat coating composition may then be allowed to flash, and the basecoat and clearcoat layers may then cure together. Other coating layers may also be applied in this "wet-on-wet" fashion.

The applied thermosettable coating compositions may be cured after a certain rest time or "flash" period. The rest time may allow for, for example, leveling and devolatilization of the coating films or evaporation of volatile constituents such as solvents from the coating films. The rest time may be assisted or shortened by applying heat or by reducing humidity, provided the heat or reduced humidity does not damage or alter the coating layers by effecting premature complete crosslinking, for instance. Although various methods of curing may be used, thermal curing may be preferred. Generally, thermal curing may be effected by exposing the coated article to elevated temperatures provided primarily by radiative heat sources. The thermosettable coating composition may be thermally cured by heating the thermosettable coating composition in a forced-air oven or by irradiating the thermosettable coating composition with infrared (IR) lamps or near infrared (NIR) radiation. Thermal cure may also take place in stages.

The thermal cure may take place at a temperature of about 30° C. to about 200° C., or from about 40° C. to about 190° C., and in particular for OEM coatings, from about 50° C. to about 180° C. for a curing time of from about 1 minute to about 10 hours, or from about 2 minutes to about 5 hours, or from about 3 minutes to about 3 hours. Longer curing times may be expected for thermosettable coating compositions suitable for automotive refinish applications, which are preferably cured at temperatures of from about 30° C. to about 90° C. The curing temperature for thermosettable coating compositions suitable for OEM applications may vary depending on crosslinker selection. However, the curing temperatures may range from about 93° C. to about 177° C., or from about 115° C. to about 150° C., or from about 115° C. to about 138° C. for a blocked acid catalyzed system. For an unblocked acid catalyzed system, the curing temperature may be from about 82° C. to about 125° C. Curing time may also vary depending on component selection and physical parameters such as the thickness of the cured films. However, typical curing times may range from about 15 minutes to about 60 minutes, or from about 15 minutes to about 25 minutes for blocked acid catalyzed systems, and from about 10 minutes to about 20 minutes for unblocked acid catalyzed systems.

Cured films formed from basecoat thermosettable coating compositions may have a thickness of from about 5 µm to about 75 depending upon a color and desired thickness of the cured film. Cured clearcoat films may have a thickness of from about 30 µm to about 65 Cured monocoat topcoat films may have a thickness of from about 30 µm to about 80 µm.

The thermosettable coating composition can be applied onto any suitable substrate, including metal substrates such as bare steel, phosphated steel, galvanized steel, or aluminum; and non-metallic substrates, such as plastics and composites. The substrate may also include a layer of another coating composition, such as a layer of an electrodeposited primer coating composition, a primer surfacer coating composition, and/or a basecoat coating composition, whether cured or uncured.

The substrate may first be primed with an electrodeposition (electrocoat) coating composition. The electrodeposition coating composition may be any suitable electrodeposition coating composition useful for automotive vehicle coating operations. Non-limiting examples of electrocoat coating compositions include CATHOGUARD® coating compositions commercially available from BASF Corporation of Florham Park, N.J. Electrodeposition coating composition baths may comprise an aqueous dispersion or emulsion including a principal film-forming epoxy resin having ionic stabilization (e.g., salted amine groups) in water or a mixture of water and organic cosolvent. A crosslinking agent reactive with the functional groups of the principal resin under certain conditions, e.g., during the application of heat, may be emulsified with the principal film-forming resin to cure the electrodeposition coating composition. Suitable examples of crosslinking agents include, without limitation, blocked polyisocyanates. The electrodeposition coating composition may also include one or more pigments, catalysts, plasticizers, coalescing aids, antifoaming aids, flow control agents, wetting agents, surfactants, UV absorbers, HALS compounds, antioxidants, and/or other additives.

The electrodeposition coating composition may be preferably applied to the substrate at a dry film thickness of from about 10 µm to about 35 After application, the substrate, e.g., a coated vehicle body, may be removed from the electrodeposition coating composition bath and rinsed with deionized water. The electrodeposition coating composition may be cured by baking the electrodeposition coating composition at, for example, from about 135° C. to about 190° C. for from about 15 minutes to about 60 minutes.

The following examples illustrate the disclosed technology and are not to be viewed in any way as limiting to the scope of the disclosure.

EXAMPLES

Preparation I

Synthesis of a Diol Having a Primary Carbamate Functional Group Using an Ammonia Solution in Methanol A flask equipped with a stirrer, a water-cooled condenser, and a nitrogen inlet is charged with glycerol carbonate (703.6 g, 5.96 moles) and an ammonia solution (782.24 g, 7 N in methanol) to form a mixture. The mixture is heated at 50° C. for 2 hours. The temperature of the mixture is then increased to 67° C. to distill off the methanol. Conversion of the carbonate functional group to a carbamate functional group is monitored by Fourier transform infrared spectroscopy (FTIR). Additional ammonia solution (300 g) is added to the mixture at 67° C. Excess methanol is once again removed from the mixture to drive the reaction to complete conversion of the carbonate functional group to the carbamate functional group. The diol having the primary carbamate functional group is obtained as a viscous yellow liquid and is dried overnight in an oven at 50° C. to remove any remaining methanol.

Preparation II

Synthesis of a Diol Having a Primary Carbamate Functional Group Using Aqueous Ammonia An aqueous ammonia solution is heated slowly up to 60° C. to generate a stream of ammonia gas that is bubbled through a flask containing glycerol carbonate having a temperature of 60° C. Conversion of the carbonate functional group to a carbamate functional group is monitored by FTIR. Ammonia gas is bubbled through the flask until complete conversion of the carbonate functional group to the carbamate functional group is observed via FTIR. Upon complete conversion, the diol having the primary carbamate functional group is dried by bubbling air through the diol at 60° C. under vacuum to remove water from the diol.

Example 1

Synthesis of a Polymer Dispersion Formed from Polyurethane Polymer Having at Least One Pendant Carbamate Functional Group and Pluracol® 710R Polyether Diol Pluracol® 710R, commercially available from BASF Corporation of Florham Park, N.J., has a hydroxyl number of 145 mg KOH/g and a number average molecular weight of 700 g/mol.

In a three neck round bottom flask equipped with a stirrer, a thermocouple, and a nitrogen inlet, 1,6 hexane diol (17.58 g), Pluracol® 710R (105.67 g), the diol of Preparation I (120.18 g), and N,N'-Dimethyl-1,3-propanediamine (DMPA) (13.31 g) are combined to form a first mixture. The first mixture is heated to 60° C. under a stream of nitrogen for 30 minutes to dry. Methyl ethyl ketone (MEK) (40.0 g) and dibutyltin dilaurate (DBTDL) (0.1 g) are added to the first mixture, and then isophorone diisocyanate (IPDI) (99.26 g) is added to form a second mixture. The second mixture is heated to 80° C. An exotherm is observed as the reaction temperature gradually increases up to 118° C. The second mixture is cooled to 80° C. and is held for 30 minutes at 80° C. Dimethylethanolamine (DMEA) (16.00 g) is added and an exotherm is observed again as the reaction temperature increases to 87° C. The reaction temperature is cooled to 80° C. and is held for 30 minutes.

Deionized water is added to obtain a thick, viscous, slightly hazy polyurethane dispersion, and aromatic 100 (Solvesso™ 100, commercially available from ExxonMobil Chemical Corporation of Baton Rouge, La.) solvent (240.50 g) is heated to 140° C. under nitrogen. A mixture of 2-hydroxyethyl methacrylate (2-HEMA) (478.97 g), lauryl methacrylate (LMA 1214) (478.97 g), azobisisobutyronitrile (AIBN) initiator (95.95 g), and aromatic 100 (39.60 g) are fed into the flask over 2.5 hours while maintaining the reaction temperature at 140° C. The monomer tank is flushed with aromatic 100 (39.60 g). A small sample is removed for gel permeation chromatography (GPC) analysis. Dibutyl tin oxide catalyst (1.72 g) is added and methanol is collected as distillate. The reaction temperature is cooled upon collection of 102.65 g of distillate. Propylene glycol methyl ether (143.55 g) is added as a solvent at 80° C. and the batch is stirred for 30 minutes at 80° C. and filtered.

Analysis of Final Polymer Dispersion:

A non-volatile component of the polymer dispersion represents 31.8% by weight of the polymer dispersion when the polymer dispersion is heated at 110° C. for 1 hour. GPC analysis of the polymer dispersion indicates that the weight average molecular weight, Mw, is 5,206 g/mol; the number average molecular weight, Mn, is 2,116 g/mol; and the polydispersity index (PDI) is 2.46. A particle size (avg. diameter) of the polyurethane dispersion is 34.8 nm as measured by a Malvern particle size analyzer.

Example 2

Synthesis of a Polymer Dispersion Formed from Polyurethane Polymer Having at Least One Pendant Carbamate Functional Group and Pluracol® 710R Polyether Diol In a three neck round bottom flask equipped with a stirrer, a thermocouple and a nitrogen inlet, 1,6 hexane diol (15.03 g), Pluracol® 710R polyol (45.15 g), the diol of Preparation II (151.53 g), and N,N'-Dimethyl-1,3-propanediamine (DMPA) (17.06 g) are combined to form a first mixture. The first mixture is heated to 60° C. under a stream of nitrogen for 30 minutes to dry. Methyl ethyl ketone (MEK) (40.0 g) and dibutyltin dilaurate (DBTDL) (0.1 g) are added to the first mixture, and then isophorone diisocyanate (IPDI) (127.23 g) is added to form a second mixture. The second mixture is heated to 80° C. An exotherm is observed as the reaction temperature gradually increases up to 119° C. The second mixture is cooled to 80° C. and is held for 30 minutes at 80° C. Dimethylethanolamine (DMEA) (16.00 g) is added and an exotherm is observed again as the reaction temperature increases to 86° C. The reaction temperature is cooled to 80° C. and is held for 30 minutes. Deionized water is added to obtain a thick, viscous, slightly hazy polyurethane dispersion.

Analysis of Final Polymer Dispersion:

A non-volatile component of the polyurethane dispersion is 31.7% by weight when the polymer dispersion is heated at 110° C. for 1 hour. GPC analysis of the polymer dispersion indicates that a weight average molecular weight, Mw, is 5,630 g/mol; a number average molecular weight, Mn, is 2,951 g/mol; and a polydispersity index (PDI) is 1.91.

Example 3

Preparation of a Clearcoat Thermosettable Coating Composition and a Cured Film Formed from the Clearcoat Thermosettable Coating Composition To the polymer dispersion of Example 2 (5.0 g), water (2.0 g), hexamethoxymethyl-melamine formaldehyde resin (0.5 g), and an amine-neutralized p-Toluenesulfonic acid (p-TSA) catalyst (0.05 g) is added to form a first mixture. The first mixture is applied onto a phosphate treated steel metal panel substrate at a wet thickness of 4 mil (101.6 μm) to form a coated substrate. After a 5 minute wait period, the coated substrate is heated in an oven at 143° C. for 45 minutes to form a panel. The panel is removed from the oven and cooled down to room temperature to form a cured film disposed on the panel. The resulting coating has a cured film thickness of 0.5 mil (12.7 μm). The cured film passes an excess of 100 water, acetone, and methyl ethyl ketone (MEK) rubs and shows a high gloss and clarity and excellent scratch resistance.

The foregoing description of the embodiments is provided for purposes of illustration and description and is not intended to be exhaustive or limiting. Individual elements or features of a particular embodiment are generally not limited to that particular embodiment, but, where applicable, are interchangeable and can be used in a selected embodiment, even if not specifically shown or described. Such variations are not to be regarded as a departure from the embodiment, and all such modifications are intended to be included within the scope of the disclosure. While the best modes for carrying out the disclosure have been described in detail, those familiar with the art to which this disclosure relates will recognize various alternative designs and embodiments for practicing the disclosure within the scope of the appended claims.

The invention claimed is:

1. A thermosettable coating composition comprising a reaction product of:
   a polyurethane polymer having at least one pendant carbamate functional group, wherein the polyurethane polymer is a polymerization reaction product of:

at least one diol having a primary carbamate functional group; and at least one polyisocyanate; and a crosslinker reactive with the at least one pendant carbamate functional group;

wherein the polymerization reaction product further includes at least one isocyanate-reactive monomer or at least one isocyanate-reactive prepolymer.

2. The thermosettable coating composition of claim 1, wherein the polyurethane polymer has a backbone having two ends, and further wherein the at least one pendant carbamate functional group extends from the backbone and is spaced apart from each of the two ends.

3. The thermosettable coating composition of claim 1, wherein the polymerization reaction product further includes at least one isocyanate-reactive prepolymer.

4. The thermosettable coating composition of claim 3, wherein the at least one diol comprises from about 4 carbon atoms to about 8 carbon atoms.

5. The thermosettable coating composition of claim 4, wherein the at least one diol is a reaction product of glycerol carbonate and a compound selected from the group consisting of ammonia, primary amines, and combinations thereof.

6. The thermosettable coating composition of claim 4, wherein the at least one diol is selected from the group consisting of 2,3-dihydroxypropyl carbamate; 1,3-dihydroxy-2-carbamoylpropane; and combinations thereof.

7. The thermosettable coating composition of claim 1, wherein the at least one diol is present in the polymerization reaction product in an amount of from about 0.1 part by weight to about 40 parts by weight based on 100 parts by weight of the polymerization reaction product.

8. The thermosettable coating composition of claim 1, wherein the at least one isocyanate-reactive monomer is a polymeric diol.

9. The thermosettable coating composition of claim 8, wherein the polymeric diol is present in the polymerization reaction product in an amount of from about 10 parts by weight to about 70 parts by weight based on 100 parts by weight of the polymerization reaction product.

10. The thermosettable coating composition of claim 8, wherein the polymeric diol is a polyester diol comprising a reaction product of:

a carbamate-functional diol; and a member selected from the group consisting of carboxylic acids, esterifiable derivatives of carboxylic acids, and combinations thereof.

11. The thermosettable coating composition of claim 8, wherein the polymeric diol is a polyether diol.

12. The thermosettable coating composition of claim 8, wherein the polymeric diol is a polycarbonate diol.

13. The thermosettable coating composition of claim 1, wherein the crosslinker is a melamine formaldehyde resin.

14. A method of forming a thermosettable coating composition, the method comprising:

polymerizing a mixture to form a polyurethane polymer having at least one pendant carbamate functional group, wherein the mixture comprises:

at least one diol having a primary carbamate functional group; and at least one polyisocyanate; and combining the polyurethane polymer and a crosslinker reactive with the at least one pendant carbamate functional group to form the thermosettable coating composition;

wherein the polyurethane polymer has a terminal hydroxyl group, and further comprising reacting the terminal hydroxyl group to form a terminal carbamate functional group.

15. The method of claim 14, further comprising dispersing the polyurethane polymer in an aqueous medium to form a polyurethane dispersion.

16. A coated article comprising:

a substrate; and a cured film disposed on the substrate and formed from a thermosettable coating composition comprising a reaction product of:

a polyurethane polymer having at least one pendant carbamate functional group, wherein the polyurethane polymer is a polymerization reaction product of:

at least one diol having a primary carbamate functional group; and at least one polyisocyanate; and a crosslinker reactive with the at least one pendant carbamate functional group;

wherein the polymerization reaction product further comprises at least one isocyanate-reactive monomer.

* * * * *